INVENTORS
FRED J. PAULET, JR. &
DAVID GORDON
BY
ATTORNEYS

INVENTORS
FRED J. PAULET, JR. &
DAVID GORDON
BY
Channing L. Richards &
Dalbert U. Shefte
ATTORNEYS United States Patent Office 3,324,698
Patented June 13, 1967

3,324,698
METHOD AND APPARATUS FOR FINISHING WELDED RECTANGULAR TUBING
Fred J. Paulet, Jr., and David Gordon, Tampa, Fla., assignors, by mesne assignments, to Industrial Supply Corporation, a corporation of Florida
Filed June 26, 1964, Ser. No. 378,230
5 Claims. (Cl. 72—340)

This invention relates generally to a method and appartus for finishing welded joints, and more particularly a finishing operation applied to the welded joint of a composite length of rectangular tubing by which the appearance and structural integrity of the tubing are improved to exceptional advantage.

Rectangular tubing is finding increased markets involving structural applications which require conformance with high standards of both strength and appearance such as, for example, column members used in modern motel structures. For the purpose of meeting demands for tubing in various sizes and lengths from a relatively limited supply, smaller pieces of tubing may be joined together by a resistance butt welding operation of the type described in copending application Ser. No. 377,306, filed June 23, 1964. Operations of this type, however, leave a substantial profile of weld flash protruding at the weld joint and have a tendency to produce a lack of straightness in the tubing due to the difficulty of aligning the tubing pieces exactly during the endwise welding and because of the distortion normally experienced in welding metal structures.

By the present invention such welded metal tubing is effectively finished by a unique broaching of the welded joint that rolls off the weld flash substantially flush with the sides of the rectangular tubing and by which the weld is simultaneously stress relieved to increase substantially the strength thereof. The present invention also provides for straightening the welded tubing in the course of clamping it for the broaching operation.

Briefly described, the operation of the present invention is carried out immediately following a butt welding operation of the aforementioned type, and while the residual temperature at the welded joint resulting from the welding remains substantially elevated, by directing a clamping force sidewise of a composite length of tubing with a lengthwise reach extending substantially from the welded joint in both lengthwise directions while opposing the clamping force with localized forces acting at the opposite tubing side and spaced in both lengthwise directions from the welded joint but within the lengthwise reach of the clamping force, and then causing the extended clamping force to bottom against the opposing localized forces so that any lengthwise bending of the composite tubing length presented to these forces is straightened and the tubing length is held securely adjacent the welded joint for working the same to remove the weld flash thereat; after which the broaching operation is performed by successively working the welded joint laterally of each tubing side with a broaching tool applied at a negative rake angle and with a working stroke extending substantially in the plane of the outer surface of the tubing sides, while the residual temperature of the welded joint from the welding operation still remains substantially elevated.

These and other features of the present invention are described in further detail below in connection with the accompanying drawings, in which:

FIG. 4 is a diagrammatic view illustrating the straightening forces applied to a length of rectangular tubing in accordance with the present invention.

Referring now in detail to the drawings, a table 10 has an upper surface 12 on which are mounted two pairs of substantially identical journal members 14 supporting the ends of parallel bars 16 on which a length of rectangular tubing T is held spaced from the upper surface 12 with the welded joint W and protruding profile of weld flash substantially centered between the bars 16 in the normal position thereof.

Figure 2:
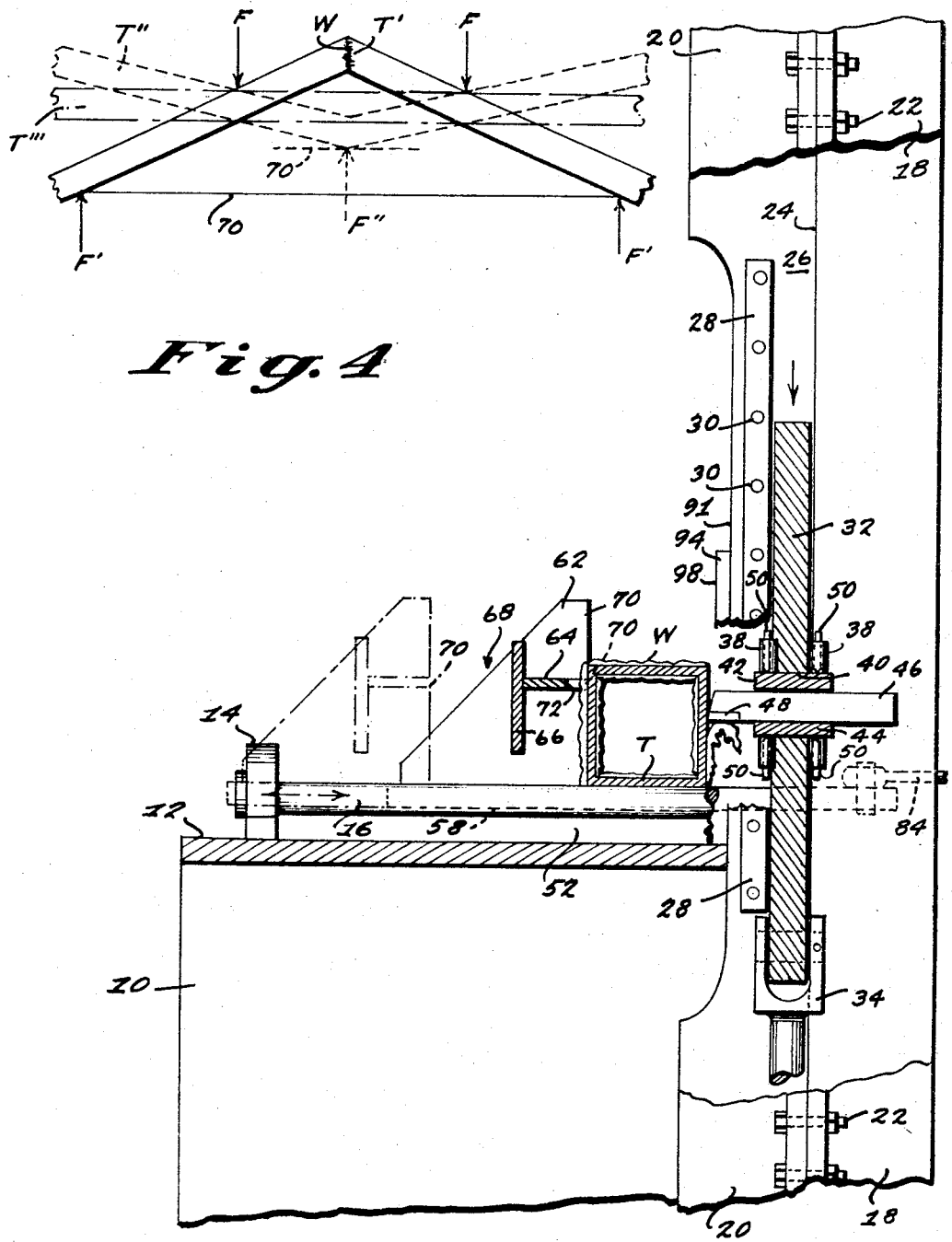
FIG. 2 is a side elevation taken substantially along line 2—2 in FIG. 1.
Figure 3:
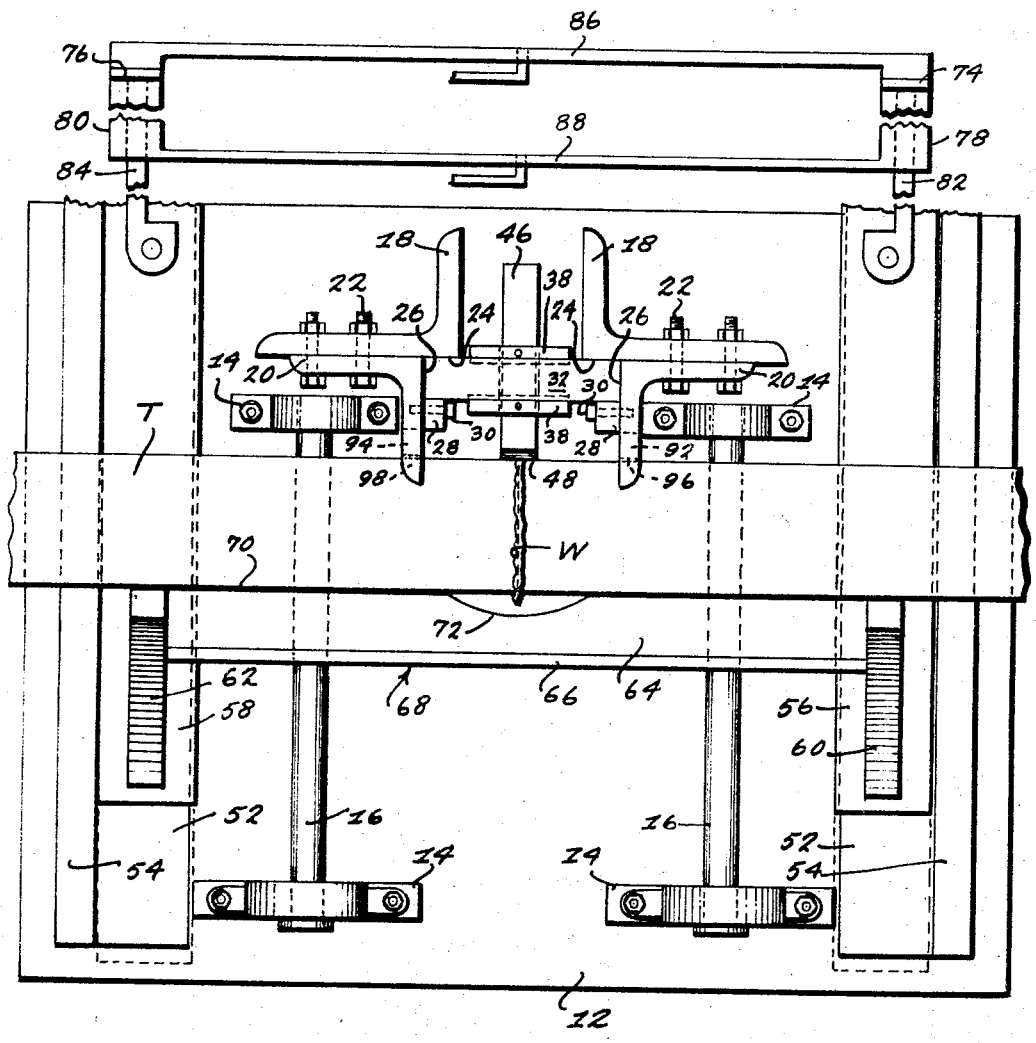
FIG. 3 is a plan view of the finishing apparatus illustrated in FIG. 1.

Extending upwardly through surface 12 are a pair of stanchion members 18 having flanges 20 connected thereto by bolts 22 so as to leave shoulder portions 24 at the adjacent sides thereof. Each of the facing surfaces 26 of flanges 20 have vertical members 28 secured thereto by bolts 30 to form with the shoulder portions 24 and surfaces 26 a pair of aligned vertical grooves in which a slide member 32 is disposed for reciprocating movement imparted thereto by a yoke 34 (FIG. 2) driven from a hydraulic motor (not shown) which is selectively operated in a conventional manner from a three-way valve 36 located at the front of table 10. A pair of plates 38 are located on either side of slide member 32 at about the center thereof; an opening 40 passes through plates 38 and slide 32 and a pair of semi-cylindrical locating blocks 42, 44 with a broaching tool 46 located therebetween are set in the opening 40 with tool 46 slightly inclined with respect to a horizontal plane so that cutting edge 48 thereof is applied to the adjacent wall of tubing T at a negative rake angle when slide 32 is moved downwardly as illustrated in FIG. 2. Screws 50 in the plates 38 abut the locating blocks 42, 44 and are used to adjust the rake angle of tool 46 and to hold it in place.

Figure 1:
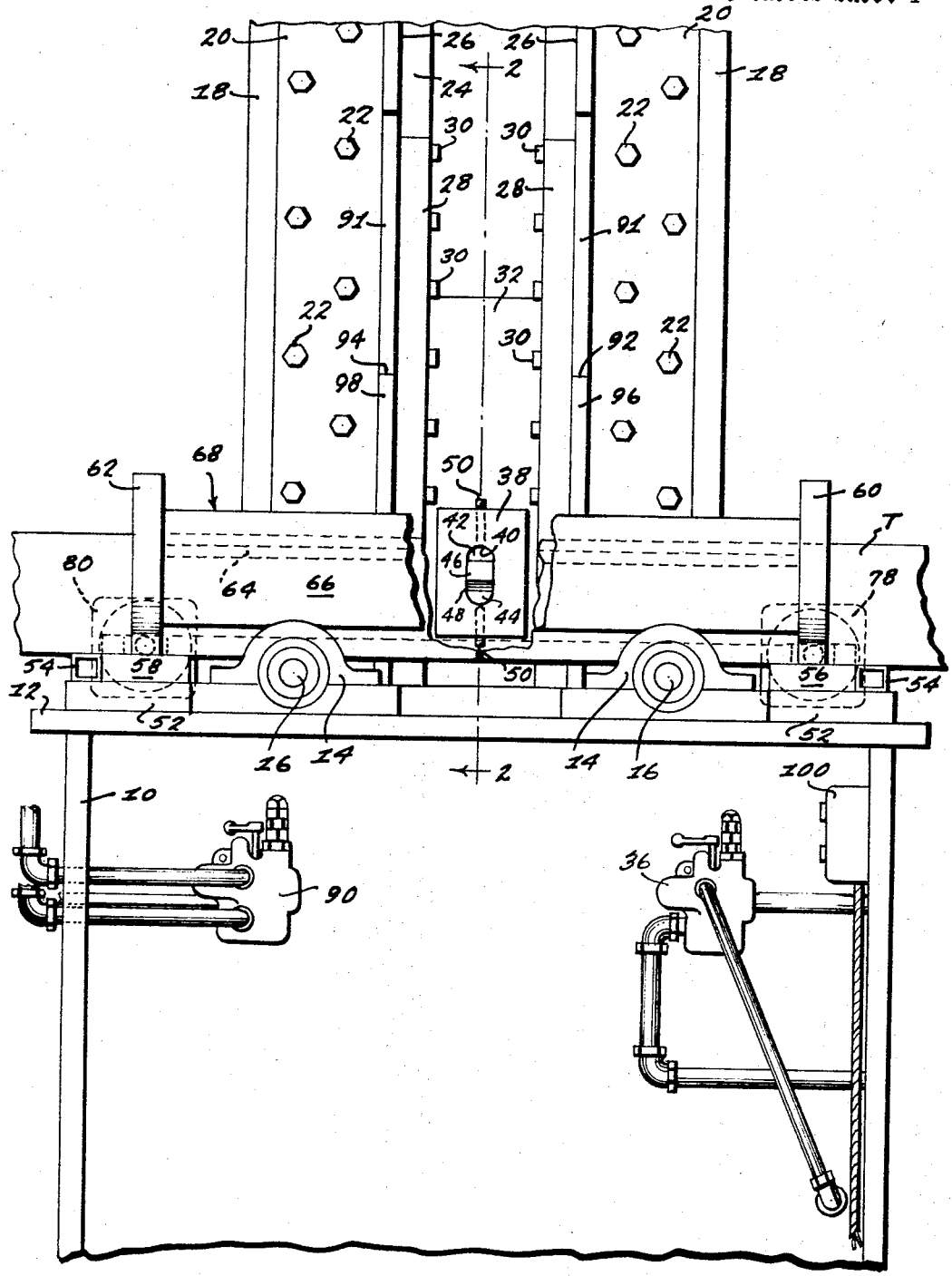
FIG. 1 is a front elevation of the finishing apparatus of the present invention.

Stationary plate members 52 are secured to table 10 and have guides 54 disposed to retain any sidewise movement of slide plates 56, 58 which are slidably mounted on members 52. Each of the slide plates 56, 58 has an upright member 60 and 62, respectively, extending therefrom, and a pair of cross members 64 and 66 are connected between the uprights 60, 62 to form an integral slide structure generally indicated by numeral 68. The faces of uprights 60, 62 and cross member 66 which are adjacent tubing T are coplanar so as to present a surface 70 for abutment with tubing T, and cross member 66 includes a notch 72 substantially at the center thereof for accommodating any profile of weld flash at the welded joint W of tubing T when abutment surface 70 is in contact therewith. The slide plates 56, 58 are connected to pistons 74 and 76 of hydraulic motors 78 and 80 by connecting rods 82 and 84. Hydraulic motors 78, 80 are connected at each end thereof to common hydraulic supply lines 86, 88 by which the movement of pistons 74, 76 and the connected slide plates 56, 58 are synchronized. Valve 70, located at the front of table 10 (FIG. 1), operates in a conventional manner to admit pressurized fluid from a source (not shown), which is usually the same source as for vertical slide 32, to one of the lines 86, 88 while connecting the other line to a low pressure reservoir (not shown) whereby the slide structure 68 is selectively operable to reciprocate along stationary plates 52. Switch 100 is used for energizing a pump or the like to make available a source of high pressure hydraulic supply.

Outer edges 91 of flanges 20 each have a stationary abutment piece 92, 94 secured thereto substantially equally spaced from notch 72 so as to be equally spaced from the welded joint of tubing T when it is in its normal position with the weld flash profile accommodated at notch 72. The surfaces 96 and 98 of the abutment pieces 92 and 94 are coplanar and, in addition, are located in the plane of movement of the working edge of broaching tool 46 so that the adjacent side of tubing T can be clamped against surfaces 96 and 98 and the broaching tool applied to the welded joint W in the plane of the outer surface of the side of the composite tubing as shown in FIG. 2 and as will be described in further detail below.

With the elements arranged in the aforementioned manner, a length of composite rectangular tubing T which has just been formed by a butt welding operation is placed on support bars 16 with one side thereof in substantial abutment with surfaces 96 and 98 while the residual temperatures of the welded joint W is in the range of approximately 800–900° C. Switch 100 is closed to energize the source of high pressure hydraulic fluid and valve 90 is manipulated to admit fluid to motors 78, 80 which cause the slide structure 68 to move toward tubing T. Depending on the direction of lengthwise bending of the tubing T which is shown exaggerated by the full line T′ and dotted line T″ positions in FIG. 4, the abutment surface 70 will contact the adjacent side of tubing T at the remote ends of the surface 70 as shown by the arrows F′ in FIG. 4 or at the center thereof as shown by the arrow F″. Because of the notch 72, the arrow F″ would actually be two arrows slightly spaced, but for all practical purposes it is a single force applied at the welded joint as indicated. Regardless of the direction of bend, however, a clamping force will be directed sidewise of tubing which has a substantial lengthwise reach determined by the lengthwise extent of abutment surface 70 and, if there is any bend in the tubing T′ or T″, this force will be applied at F″ or F′. The clamping force will be opposed at surfaces 96 and 98 of stationary abutment pieces 92 and 94 by localized forces F, F acting on the opposite tubing side spaced equally in both lengthwise directions from the welded joint W but within the lengthwise extent of abutment surface 70, and movement of slide structure 68 will cause the clamping force to bottom against the opposing localized forces of surfaces 96 and 98 so that the lengthwise bending of the composite tubing T′ or T″ presented to these forces is straightened as indicated by tubing T‴ in FIG. 4, and will be held securely adjacent the welded joint W. Of course if the tubing has no lengthwise bend to present to these opposing forces, the abutment surface 70 will abut the adjacent tubing wall substantially along the entire lengthwise extent thereof so that the clamping force is caused initially to bottom against the localized forces of surfaces 96 and 98 to hold securely the tubing T without any straightening movement thereof.

With tubing T thus held securely in place, the operator manipulates valve 36 to cause side plate 32 to move downwardly and the broaching tool is applied to the portion of the welded joint W on the tubing side adjacent the surfaces 96 and 98 laterally with respect to the sides thereof at a negative rake angle and with a working stroke extending substantially in the plane of the outer surface of the adjacent tubing side while the aforementioned residual temperature of the welded joint W remains at a substantially elevated temperature. With the weld at this substantially elevated temperature, the broaching tool 46 actually rolls off the excess metal flush with the sides of the tubing in a quick, even stroke which leaves a smooth surface at the weld joint W which, if desired, can be finished by a grinding wheel or the like if a smoother surface is required. In addition, it has been determined that the broaching tool 46 serves to stress relieve the welded joint W as it rolls off the profile of weld flash. It is not known exactly in what manner the metal weld is stress relieved by the broaching tool 46 although it is believed that the negative rake angle of tool 46 acting against the weld flash profile exerts a pressure on the weld which spreads the hot metal slightly so that as it cools the contraction at the weld is not as acute. In addition, it is believed that this broaching tool induces residual compressive stress in the surface of the weld metal in a manner somewhat similar to peening which reduces the surface tensile stresses from externally applied loads. Whatever the exact cause, tests conducted on lengths of composite tubing indicate that the tensile strength is improved by as much as fifteen percent when the broaching and stress relieving operation of the present invention is applied to the welded joint W; in some cases, this results in the weld actually being stronger than the remainder of the tubing.

There is no exact elevated temperature range which is critical to the straightening, broaching and stress relieving of the present invention. At temperatures in excess of approximately 800° C., the operations of the present invention are carried out easier and with better results; however, even at lower temperatures which are still substantially elevated above room temperature, the results obtained are greater than if the operations are carried out at room temperature. For this reason, in actual practice, the composite length of tubing T is carried from the aforementioned resistance butt welding apparatus (where it reaches temperatures in the plastic range) and stress relieved while the residual temperature of the welded joint remains substantially elevated.

The present invention has been described in detail above for purposes of illustration only and it not intended to be limited by this description or otherwise except as defined in the appended claims.

We claim:

1. A method of broaching and stress relieving the welded joint of a composite length of rectangular carbon steel tubing which has just been formed by joining two smaller pieces of tubing using a butt welding operation which leaves a substantial profile of weld flash protruding at the welded joint, said method comprising positioning said composite length of rectangular tubing so that the outer surface of a flat side wall thereof having a weld flash profile is located and held in the plane of movement of the working edge of a broaching tool, and working said welded joint of said side wall laterally with respect thereto with a broaching tool applied at said negative rake angle and with its working edge traveling substantially in said plane of the outer surface of said side wall of said composite tubing, while the residual temperature of said welded joint from said butt welding operation remains substantially elevated so that said weld flash is rolled off substantially flush with the outer surface of said side wall and said welded joint is stress relieved by said working.

2. A method of straightening, broaching and stress relieving a composite length of rectangular tubing formed by joining two smaller lengths endwise using a resistance butt welding operation which induces lengthwise bending of said tubing and leaves a substantial profile of weld flash protruding at the welded joint, the method comprising the steps, carried out immediately following said butt welding operation and while the residual temperature of said welded joint resulting from said welding remains substantially elevated, of directing an extended clamping force sidewise of said composite length of tubing with a lengthwise reach extending substantially from said welded joint in both lengthwise directions while opposing said clamping force with localized forces acting at the opposite side of said composite tubing length and spaced in both lengthwise directions from said welded joint but within the lengthwise reach of said clamping force, causing said extended clamping force to bottom against said opposing localized forces so that any lengthwise bending of said composite tubing length presented to said forces is straightened and said tubing length is held securely adjacent said welded joint for working the same to remove said weld flash thereat, working the welded joint of the held tubing length at said opposite side on which said localized forces act with a broaching tool applied at a negative rake angle and with a working stroke extending substantially in the plane of the outer surface of said tubing side and while the residual temperature at said welded joint resulting from said butt welding operation still remains substantially elevated so that said weld flash is rolled off substantially flush with the outer surface of said opposite side and the welded portion thereof is stress relieved by said working, and repeating said steps with respect to each side of said rectangular tubing.

3. A method of straightening, broaching and stress relieving as described in claim 2 and further characterized in that the lengthwise extent of said clamping force reach, as well as the spacing of said localized forces, is substantially equal in both lengthwise directions from said welded joint.

4. Apparatus for straightening, broaching and stress relieving a composite length of rectangular tubing formed by joining two smaller lengths endwise using a resistance butt welding operation which induces lengthwise bending of said tubing and leaves a substantial profile of weld flash protruding at the welded joint, said apparatus comprising an elongated abutment surface disposed to direct an extended clamping force sidewise of said composite length of tubing with a lengthwise reach extending substantially from said welded joint in both lengthwise directions, stationary means disposed to oppose said clamping force locally at the opposite side of said composite length of tubing and at positions spaced in both lengthwise directions from said welded joint but within the lengthwise reach of said elongated abutment surface, and means for causing said abutment surface to bottom on said tubing length against said stationary means so that any lengthwise bending of said composite length of tubing presented to said abutment surface and said stationary means is straightened and said tubing length is held securely adjacent said welded joint for working the same to remove said weld flash thereat, and broaching means including a broaching tool located between said stationary means and disposed for movement laterally across the welded portion of said opposite tubing side substantially in the plane of the outer surface thereof and at a negative rake angle while the residual temperature at said welded joint resulting from said butt welding operation still remains substantially elevated so that said weld flash is rolled off substantially flush with the outer surface of said opposite side and said welded portion thereof is stress relieved by said broaching.

5. Apparatus for straightening, broaching and stress relieving as described in claim 4 and further characterized in that said selectively operable means includes a pair of slide elements disposed for selective movement sidewise of said composite length of tubing, upright members extending from each of said slide elements and a cross member connected between said upright members and presenting jointly therewith an elongated abutment surface for directing said clamping force, said abutment member including a notched portion substantially in the center thereof for accommodating any weld flash at the abutting side of said composite length of tubing.

References Cited

UNITED STATES PATENTS

| | | | |
|---|---|---|---|
| 1,975,939 | 10/1934 | Grotness | 90—24 |
| 2,564,391 | 8/1951 | Burns | 148—11.5 |
| 2,750,853 | 6/1956 | Stevens | 90—24 |
| 2,959,842 | 11/1960 | Meyers | 29—98 |
| 2,989,902 | 6/1961 | Poynter | 90—96 |
| 3,163,930 | 1/1965 | Stanley | 29—481 |
| 3,227,851 | 1/1966 | Greenberger | 29—481 |

CHARLES W. LANHAM, *Primary Examiner.*

L. A. LARSON, *Assistant Examiner.*